March 28, 1967
EIZO AOKI
3,310,840
HYDRAULICALLY ACTUATED CLAMPING MECHANISM FOR THE MOLD
IN AN INJECTION MOLDING APPARATUS
Filed March 31, 1964
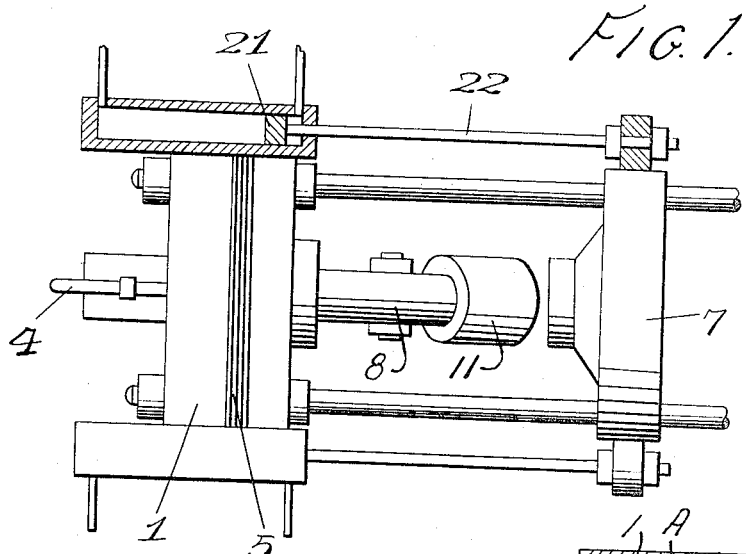
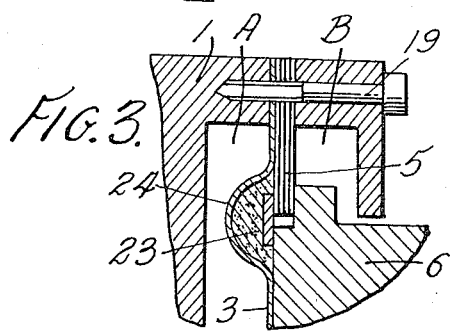
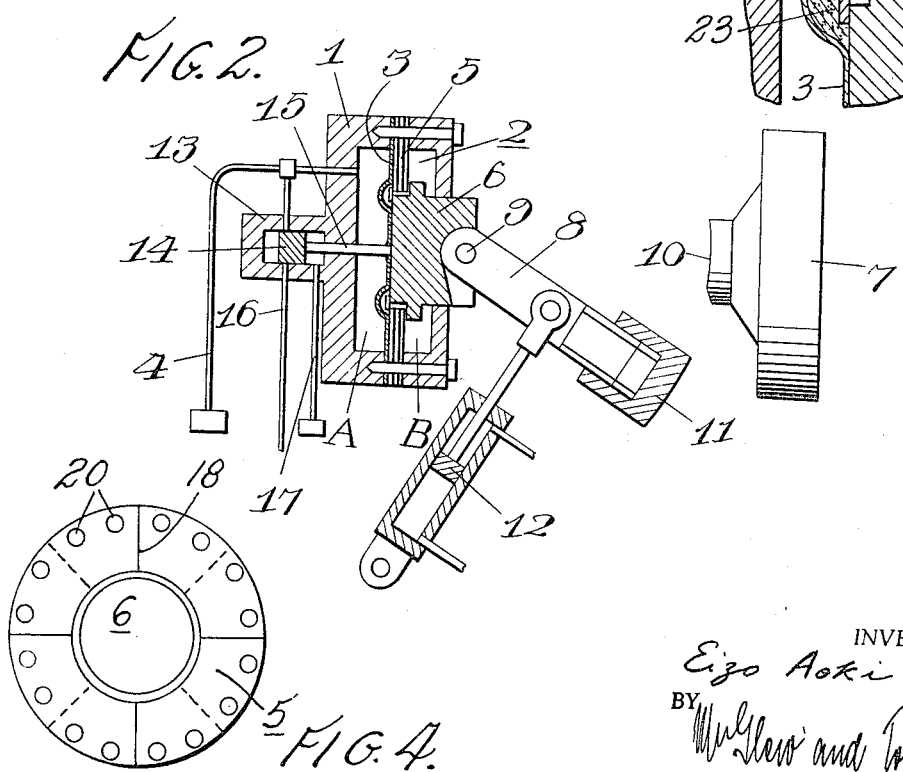
INVENTOR.
Eizo Aoki
BY

United States Patent Office 3,310,840
Patented Mar. 28, 1967

3,310,840
HYDRAULICALLY ACTUATED CLAMPING MECHANISM FOR THE MOLD IN AN INJECTION MOLDING APPARATUS
Eizo Aoki, 935 Oaza Nagano, Tchinomiya-cho, Mitsu-gun, Okayama Prefecture, Japan
Filed Mar. 31, 1964, Ser. No. 356,243
Claims priority, application Japan, Sept. 17, 1963, 38/50,004
6 Claims. (Cl. 18—30)

This invention relates to a hydraulically actuated clamping mechanism for the mold in an injection molding apparatus.

An object of the present invention is to provide a hydraulically actuated clamping mechanism which can be operated by transmitting a minimum amount of fluid to hold the mold parts of an injection molding apparatus in a tightly closed condition against heavy pressure exerted by the injected material.

Another object of the present invention is to provide a hydraulically actuated clamping mechanism, in which a hydraulic press chamber and a receiver piston are partitioned by a diaphragm which makes, on the other hand, the hydraulic press chamber to be perfectly water-tight, so that the reduction in hydraulic pressure caused by fluid leakage is avoided thereby and high hydraulic pressure efficiency is attained through transmission of a minimum amount of fluid.

A further object of the present invention is to provide a hydraulically actuated clamping mechanism, wherein separation of the mold parts of an injection molding apparatus to remove the finished article therefrom and clamping of the parts together against heavy pressure exerted by the injected material are independently operated and effected by respective piston rods, so that high hydraulic pressure is obtainable by using pressure pumps comparatively of small capacity.

Further objects and advantages of the present invention will be apparent from the following description, reference being made to the accompanying drawings wherein a preferred embodiment of the present invention is shown by way of example.

FIG. 1 is a plan view of the hydraulically actuated clamping mechanism of the present invention, with a part in section.

FIG. 2 is a sectional side elevation thereof.

FIG. 3 is an enlarged sectional view of part of the apparatus shown in FIG. 2.

FIG. 4 is an elevation view of a receiver piston and an elastic disk which supports the piston.

Referring to the drawings, a chamber 2 provided in a structure 1 is partitioned by a diaphragm 3 to form two chambers A and B. The chamber A, connected with a fluid transmitting pipe 4 at one portion, functions as a hydraulic press chamber. Chamber B is provided with a receiver piston 6 supported by an elastic disk 5, said receiver piston being closely contacted with the diaphragm 3 at its rear end and, at its front end, being pivotally connected by a pivot 9 with ar od 8, which is movably interposed between a movable part 7 of a mold and the receiver piston 6. A tubular cap 11, the diameter of which corresponds to a pressure receiving surface 10 of the movable part 7 of the mold are indicated at 21, their to the front free end of the rod 8, so that the whole length of said rod may be suitably adjusted to the space between the movable part of the mold and the receiver piston. The rod 8 is, further, equipped with a piston structure 12 of simple design, so that it may make a circular motion, centering around the pivot 9.

The diaphragm 3 is fitted with a piston rod 15 connected to a piston 14, which is contained in a cylinder 13 interconnected to the back side of the structure 1. To the cylinder 13 there are connected a branch pipe 16 diverging from the fluid transmitting pipe 4, and a pipe 17 which displaces fluid for giving reciprocating movement to the piston 14.

The elastic disk 5, which supports the receiver piston 6, is made of plural sheets having cuts 18 which extend radially around the receiver piston, and holes 20 which receive bolts 19. In the drawings, the pistons for moving the movable part 7 of the mold are indicated 21, their connecting rods are indicated at 22, and the rubber-like elastic body filling up a circular concavity on the diaphragm is indicated at 23.

The operation of the mechanism of the present invention will be further explained in the following.

Firstly, the movable part 7 of the mold, being advanced toward its fixed part, not shown in the drawings, by means of pistons 21 and their connecting rods 22, the mold is held closed. The rod 8 is then interposed between the receiver piston 6 and the movable part of the mold, so as to be in a straight line with the latter two. Subsequently, fluid is supplied under pressure to the chamber A of the structure 1 through a fluid transmitting pipe 4. The hydraulic pressure produced thereby is transmitted onto the receiver piston 6 through the diaphragm interposed between chambers A and B. The receiver piston 6 is slidably moved in its axial direction toward the movable part of the mold and the mold parts are thereby, tightly clamped together. Since the fluid under pressure in the chamber A is water-tightly kept in the structure 1 by the diaphragm 3, a slippage, such as seen in the piston cylinder of the known mechanism, will never occur in the mechanism of the present invention and consequently high hydraulic pressure can be attained efficiently by displacing a minimum amount of fluid. When the diaphragm is expanded to its maximum limit, the piston 14, one end of which is fittedly connected to said diaphragm, opens the branch pipe 16, and a fluid transmitted through a fluid transmitting pipe is reversed therefrom to a fluid supply tank not shown in the drawings, so that the diaphragm may not be broken down. In addition to the above mechanism for preventing the collapse, the diaphragm 3, being formed with the circular concavity 24, and backed with a rubber like elastic body filled into the concavity, can be expanded more elastically. The receiver piston 6, being supported by the elastic disk 5 having radially extending cuts 18, can be slidably and constantly moved in the axial direction.

It is to be understood that the invention is not limited to the embodiment illustrated in the drawings. For instance, the rod 8 interposed between the movable part 7 of the mold and the receiver piston 6 may be a mechanism other than the one illustrated in the drawings as an embodiment, provided that it can close the mold, being in a straight line with the two parts thereof.

As described above, the essential points are that the action of clamping the mold parts together against heavy pressure exerted by the injected material is efficiently accomplished by displacing a minimum amount of fluid in the mechanism of the present invention, and the present mechanism can be manufactured at low production costs, because of there being no possibility of any fluid leakage in the mechanism.

What I claim is:

1. A hydraulically actuated clamping mechanism for the mold in an injection molding apparatus comprising a structure having a hydraulic press chamber partitioned by a diaphragm, a receiver piston supported by an elastic disk so as to closely contact with said diaphragm at its rear end, a rod movably and insertedly interposing between the front free end of the receiver piston and a pressure receiving surface of a movable part of a mold, a cylinder interconnected to the back side of the structure, a connecting rod connecting a piston contained in the cylinder with the diaphragm, and a fluid transmitting pipe connected to the hydraulic press chamber and also provided with a branch pipe diverging from said fluid transmitting pipe.

2. A hydraulically actuated clamping mechanism for the mold in an injection molding apparatus as claimed in claim 1, wherein said elastic disk is made of plural sheets having cuts extending radially around its center.

3. A hydraulically actuated clamping mechanism for the mold of an injection molding apparatus comprising, in combination, a structure formed with a hydraulic pressure chamber; a diaphragm dividing said chamber into a front sub-chamber and a rear sub-chamber; an annular elastic disk in said front sub-chamber adjacent said diaphragm; a first piston supported by said elastic disk in said front sub-chamber and with its rear face in close contact with said diaphragm; a first piston rod means removably interposed between the front face of said first piston and a pressure receiving surface of a movable part of the mold; a cylinder on the rear surface of said structure; a second piston displaceable in said cylinder; a second piston rod interconnecting said second piston and said diaphragm; a pressure fluid supply pipe connected to said rear sub-chamber to supply hydraulic fluid under pressure thereto; and a branch pipe connecting said supply pipe to said second cylinder.

4. A hydraulically actuated clamping mechanism for the mold of an injection molding apparatus, as claimed in claim 3, including a fluid return pipe connected to said second cylinder, said branch pipe and said return pipe opening into said second cylinder in the same diametric plane through said second cylinder; said second piston normally blocking flow of fluid from said branch pipe to said return pipe and, upon a predetermined displacement of said diaphragm; moving from the position blocking such flow of fluid through said return cylinder to a position providing for flow of fluid from said branch pipe to said return pipe to limit the effect hydraulic pressure on said diaphragm.

5. A hydraulically actuated clamping mechanism for the mold of an injection molding apparatus, as claimed in claim 3, including a second hydraulic fluid supply pipe connected to said second cylinder and operable to apply pressure to the forward face of said second piston to retract said second piston through said second cylinder.

6. A hydraulically actuated clamping mechanism for the mold of an injection molding apparatus, as claimed in claim 3, in which said diaphragm has a forwardly opening annular concavity adjacent the inner periphery of said annular elastic disk; and a filling of resilient material in said annular cavity.

References Cited by the Examiner
UNITED STATES PATENTS 2,900,917  8/1959  Schinnerer _____ 91—400 X
2,998,804  9/1961  Clement _____ 91—400 X

FOREIGN PATENTS 1,180,494  12/1958  France.
867,784    5/1961   Great Britain.

J. SPENCER OVERHOLSER, *Primary Examiner.*

W. L. McBAY, *Assistant Examiner.*